US009034566B2

(12) United States Patent
Hirayama et al.

(10) Patent No.: US 9,034,566 B2
(45) Date of Patent: May 19, 2015

(54) RESIN COMPOSITION FOR FORMING OPTICAL WAVEGUIDE AND OPTICAL WAVEGUIDE USING THE COMPOSITION

(71) Applicant: NITTO DENKO CORPORATION, Ibaraki-shi, Osaka (JP)

(72) Inventors: Tomoyuki Hirayama, Ibaraki (JP); Takami Hikita, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 28 days.

(21) Appl. No.: 13/722,107

(22) Filed: Dec. 20, 2012

(65) Prior Publication Data

US 2013/0163941 A1    Jun. 27, 2013

(30) Foreign Application Priority Data

Dec. 26, 2011 (JP) ................... 2011-283616

(51) Int. Cl.
*G02B 6/10*     (2006.01)
*G02B 1/04*     (2006.01)
(Continued)

(52) U.S. Cl.
CPC ............ *C09D 137/00* (2013.01); *C09D 133/14* (2013.01); *C09D 133/08* (2013.01);
(Continued)

(58) Field of Classification Search
CPC ............ G02B 6/10; G02B 2006/1212; G02B 2006/121; G02B 2006/12069; G02B 2006/12097; G02B 1/048; G02B 6/138; C09D 137/00; C09D 133/14; C09D 133/08; C08F 216/38; C08F 216/06; C08F 218/08
See application file for complete search history.

(56) References Cited

U.S. PATENT DOCUMENTS 3,307,943 A * 3/1967 Bernard Heiart Robert . 430/254
3,732,106 A * 5/1973 Steppan et al. ............ 430/283.1
(Continued)

FOREIGN PATENT DOCUMENTS

CA    1276048 C    11/1990
EP    0 216 083 A1    4/1987
(Continued)

OTHER PUBLICATIONS

Extended European Search Report dated Feb. 21, 2013, issued in corresponding European Patent Application No. 12198471.0.
(Continued)

*Primary Examiner* — Martin Angebranndt
(74) *Attorney, Agent, or Firm* — Westerman, Hattori, Daniels & Adrian, LLP (57) ABSTRACT

A resin composition for forming an optical waveguide brings together excellent bending resistance, a low refractive index, and low tackiness suitable for a roll-to-roll (R-to-R) process as a material for forming an optical waveguide, in particular, a material for forming a clad layer. The resin composition for forming an optical waveguide to be used in formation of an optical waveguide includes a polyvinyl acetal compound having a structural unit represented by the following general formula (1) as a main component:

in the formula (1), R represents an alkyl group having 1 to 3 carbon atoms, and k, m, and n represent ratios of respective repeating units in a main chain and each represent an integer of 1 or more.

20 Claims, 2 Drawing Sheets

(51) Int. Cl.

| | | |
|---|---|---|
| *C08F 216/38* | (2006.01) | |
| *C08F 216/06* | (2006.01) | |
| *C08F 216/08* | (2006.01) | |
| *C09D 137/00* | (2006.01) | |
| *C09D 133/14* | (2006.01) | |
| *C09D 133/08* | (2006.01) | |
| *G02B 6/12* | (2006.01) | |
| *C08F 218/08* | (2006.01) | |
| *G02B 6/138* | (2006.01) | |

(52) U.S. Cl.
CPC .............. *G02B2006/12069* (2013.01); *G02B 2006/1219* (2013.01); *G02B 2006/12097* (2013.01); *C08F 216/38* (2013.01); *C08F 216/06* (2013.01); *C08F 218/08* (2013.01); *G02B 1/048* (2013.01); *G02B 6/138* (2013.01)

(56) References Cited

U.S. PATENT DOCUMENTS

| | | | |
|---|---|---|---|
| 4,652,604 A * | 3/1987 | Walls et al. | 522/63 |
| 4,670,507 A * | 6/1987 | Walls et al. | 525/61 |
| 4,762,381 A | 8/1988 | Uemiya et al. | |
| 4,940,646 A * | 7/1990 | Pawlowski | 430/175 |
| 5,026,135 A * | 6/1991 | Booth | 385/130 |
| 5,738,970 A * | 4/1998 | Hsieh et al. | 430/259 |
| 2002/0122647 A1* | 9/2002 | Blomquist et al. | 385/129 |
| 2003/0186031 A1* | 10/2003 | Washizuka | 428/195 |
| 2007/0260021 A1 | 11/2007 | Lumpp | |
| 2013/0000725 A1* | 1/2013 | Oliver et al. | 136/259 |

FOREIGN PATENT DOCUMENTS

| | | | |
|---|---|---|---|
| EP | 0 230 520 A2 | | 8/1987 |
| JP | 04-185633 | * | 7/1992 |
| JP | 11-199846 | * | 7/1999 |
| JP | 2006-18110 A | | 1/2006 |
| JP | 2007-115827 | * | 5/2007 |
| JP | 2007-119585 | * | 5/2007 |
| JP | 2009-235388 | * | 10/2009 |
| JP | 2010-164770 A | | 7/2010 |
| JP | 2010-243920 A | | 10/2010 |
| JP | 2011-154052 | * | 8/2011 |
| WO | 2006/002831 A1 | | 1/2006 |

OTHER PUBLICATIONS

European Communication pursuant to Article 94(3) EPC dated Jan. 23, 2014, issued in European Patent Application No. 12198471.0 (3 pages).

* cited by examiner

RESIN COMPOSITION FOR FORMING OPTICAL WAVEGUIDE AND OPTICAL WAVEGUIDE USING THE COMPOSITION

BACKGROUND OF THE INVENTION

1. Field of the Invention

The present invention relates to a resin composition for forming an optical waveguide to be used as a material for forming, for example, a clad layer constituting an optical waveguide in an optical waveguide apparatus to be widely used in optical communication, optical information processing, or any other general optics such as an opto-electric hybrid board, and to an optical waveguide using the composition.

2. Description of the Related Art

A material for forming an optical waveguide for an opto-electric hybrid board is required to have characteristics such as high flexibility and a low refractive index in accordance with its use applications. Further, low tackiness has become an essential characteristic in order that the material may be adapted to a roll-to-roll (R-to-R) process with an eye toward mass production.

In general, a reduction in elastic modulus of a material for forming a clad layer of an optical waveguide has been conventionally performed for imparting high flexibility. In addition, for the reduction in elastic modulus, a material obtained as described below is used as the material for forming the clad layer. A phenoxy resin as an aromatic, long-chain, bifunctional epoxy resin having tough characteristics is used as a binder resin and the binder resin is blended with a long-chain, bifunctional resin having a main skeleton (such as an aliphatic skeleton) that imparts flexibility. Thus, the reduction in elastic modulus is achieved.

However, such blending design as described above is liable to show the following tendency. The refractive index of the clad layer increases owing to the use of the aromatic binder resin, with the result that an optical loss at the time of bending needed for a material for forming an optical waveguide for an opto-electric hybrid board deteriorates. In addition, when an aliphatic, bifunctional resin capable of imparting a low refractive index is added to compensate for the increase in refractive index, the following problem of a trade-off arises. The addition sacrifices bending property and tackiness (see, for example, JP-A-2010-243920 and JP-A-2010-164770).

Against such technological background, a forming material that brings together high flexibility (bending resistance), a low refractive index, and low tackiness at the time when the material is uncured has been strongly desired as a material for forming a clad layer.

SUMMARY OF THE INVENTION

A resin composition is provided for forming an optical waveguide that brings together excellent bending resistance, a low refractive index, and low tackiness suitable for an R-to-R process as a material for forming an optical waveguide, in particular, a material for forming a clad layer, and an optical waveguide using the composition.

A first gist is a resin composition for forming an optical waveguide to be used in formation of an optical waveguide, including a polyvinyl acetal compound having a structural unit represented by the following general formula (1) as a main component:

in the formula (1), R represents an alkyl group having 1 to 3 carbon atoms, and numbers of repetitions k, m, and n represent ratios of respective repeating units in a main chain and each represent an integer of 1 or more.

In addition, a second gist is an optical waveguide, including: a substrate; and a clad layer formed on the substrate, the optical waveguide being obtained by forming a core layer for propagating an optical signal in the clad layer in a predetermined pattern, in which the clad layer is formed of the above-mentioned resin composition for forming an optical waveguide.

The resin composition for forming an optical waveguide brings together excellent bending resistance, a low refractive index, and low tackiness suitable for an R-to-R process upon production as a material for forming the clad layer of an optical waveguide. The use of a specific polyvinyl acetal compound having a structural unit represented by the general formula (1) as a binder resin component to be blended achieves this.

That is, with regard to the low refractive index, a solid aliphatic resin as the specific polyvinyl acetal compound is used as a binder resin and hence such an increase in refractive index as to be involved in the blending of a conventional phenoxy resin does not occur. In addition, with regard to the low tackiness, the following assumption is made. The binder resin itself as the solid aliphatic resin is a resin having flexibility. Accordingly, the use of the resin can increase the addition amount of the binder resin component and hence enables the suppression of the addition amount of a liquid, bifunctional, aliphatic resin as another resin component. As a result, the low tackiness can be imparted.

As described above, a resin composition is disclosed for forming an optical waveguide using a specific polyvinyl acetal compound having a structural unit represented by the general formula (1) as a main component. Accordingly, for example, when the clad layer of an optical waveguide is formed by using the resin composition for forming an optical waveguide, the layer exerts excellent bending resistance in a state of maintaining a low refractive index. Similarly, low tackiness at the time when the layer is uncured suitable for an R-to-R process is imparted to the layer in a state where the low refractive index is maintained. As described above, the bending resistance improves while the low refractive index is maintained. Accordingly, a bending loss is alleviated. In addition, the solid aliphatic resin is used as a binder resin and hence the tackiness is alleviated while the low refractive index is maintained.

DETAILED DESCRIPTION OF THE INVENTION

Next, an embodiment of the present invention is described in detail, provided that the present invention is not limited to the embodiment.

<<Resin Composition for Forming Optical Waveguide>>

A resin composition for forming an optical waveguide is a resin composition using a specific polyvinyl acetal compound as a main component and containing a photoradical polymerization initiator in addition to the compound. It should be noted that the term "main component" refers to a main component that substantially constitutes the resin composition for forming an optical waveguide. The term does not mean that only the usage thereof is of importance but means that the component exerts significant influences on the physical properties and characteristics of the entirety of the resin composition. Specifically, the weight ratio of the specific polyvinyl acetal compound in the resin composition for forming an optical waveguide is 25 wt % or more, more preferably 30 wt % or more of the entirety of the resin composition.

The specific polyvinyl acetal compound has a structural unit represented by the following general formula (1) and plays a role as a binder resin.

(1)

In the formula (1), R represents an alkyl group having 1 to 3 carbon atoms, and numbers of repetitions k, m, and n represent ratios of respective repeating units in a main chain and each represent an integer of 1 or more.

In the formula (1), R represents an alkyl group having 1 to 3 carbon atoms, preferably a propyl group. In addition, in the respective numbers of repetitions k, m, and n, k preferably represents 60 to 80, m preferably represents 1 to 10, and n preferably represents 10 to 39.

The specific polyvinyl acetal compound has a weight-average molecular weight of preferably 10,000 to 100,000, more preferably 40,000 to 60,000. It should be noted that the weight-average molecular weight is calculated from, for example, the respective introduction amounts of a butyral group, an acetal group, and an acetyl group with respect to a polyvinyl alcohol serving as a raw material.

For example, when the resin composition for forming an optical waveguide is obtained by dissolving resin components in an organic solvent, the specific polyvinyl acetal compound is incorporated at a ratio of preferably 20 to 80 wt %, more preferably 20 to 60 wt %, particularly preferably 20 to 40 wt % with respect to the resin components in the resin composition. That is, when the content of the specific polyvinyl acetal compound is excessively small, it becomes difficult to obtain a desired effect. In contrast, when the content of the specific polyvinyl acetal compound is excessively large, the following tendency is observed. The abundance of a photoreactive group relatively reduces and hence a patterning shape deteriorates.

In addition to the specific polyvinyl acetal compound, any other resin component such as an acrylate-based resin or an epoxy-based resin is appropriately used in the resin composition for forming an optical waveguide.

Specific examples of the acrylate-based resin include urethane acrylate resins, epoxy acrylate resins, and trimethylolpropane (alkylene oxide-modified) triacrylate resins, including di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, 1,3-butanediol di(meth)acrylate, 2-methyl-1,3-propanediol di(meth)acrylate, aromatic (meth)acrylates such as bisphenol A di(meth)acrylate, bisphenol F di(meth)acrylate, bisphenol AF di(meth)acrylate, and a fluorene-type di(meth)acrylate, trimethylolpropane tri(meth)acrylate, pentaerythritol tri(meth)acrylate, dipentaerythritol hexa(meth)acrylate, ditrimethylolpropane tetra(meth)acrylate, pentaerythritol tetra(meth)acrylate, and dipentaerythritol penta(meth)acrylate.

The photoradical polymerization initiator is used for imparting curability by photoirradiation to the resin composition for forming an optical waveguide, e.g., for imparting UV curability.

Examples of the photoradical polymerization initiator include photopolymerization initiators such as benzoins, benzoin alkyl ethers, acetophenones, aminoacetophenones, anthraquinones, thioxanthones, ketals, benzophenones, xanthones, and phosphine oxides. Specific examples thereof include 2,2-dimethoxy-1,2-diphenylethan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propane, 2-hydroxy-1-{4-[4-(2-hydroxy-2-methyl-propionyl)-benzyl]phenyl}-2-methyl-propan-1-one, 2-benzyl-2-dimethylamino-1-(4-morpholinophenyl)-butanone-1,2-m ethyl-1-(4-methylthiophenyl)-2-morpholinopropan-1-one, bis(2,4,6-trimethylbenzoyl)-phenylphosphine oxide, 2,4,6-trimethylbenzoyl-diphenyl-phosphine oxide, bis(η5-2,4-cyclopentadien-1-yl)-bis[2,6-difluoro-3(1H-pyrrol-1-yl)-phenyl]titanium, and 2-hydroxy-1-{4-[4-(2-hydroxy-2-methyl-propionyl)-benzyl]phenyl}-2-methyl-propan-1-one. One kind of those initiators is used alone, or two or more kinds thereof are used in combination. Of those, from the viewpoints of a high curing speed and thick film curability, 2,2-dimethoxy-1,2-diphenylethan-1-one, 1-hydroxy-cyclohexyl-phenyl-ketone, and 2-hydroxy-1-{4-[4-(2-hydroxy-2-methyl-propionyl)-benzyl]phenyl}-2-methyl-propan-1-one are preferably used.

The content of the photoradical polymerization initiator is set to preferably 0.5 to 5 parts by weight, particularly preferably 1 to 3 parts by weight with respect to 100 parts by weight of the resin components in the resin composition for forming an optical waveguide. That is because of the following reasons. When the content of the photoradical polymerization initiator is excessively small, sufficiently satisfactory photocurability by ultraviolet irradiation is hardly obtained. In addition, when the content of the photoradical polymerization initiator is excessively large, the following tendency is observed. The photosensitivity of the resin composition is raised, and hence shape anomaly occurs upon patterning and the pot life of a varnish shortens.

In addition to the specific polyvinyl acetal compound, a resin component except the specific polyvinyl acetal compound, and the photoradical polymerization initiator, for example, the following additives are each added to the resin composition for forming an optical waveguide as required: compounds including a silane- or titanium-based coupling agent for improving adhesive property, a cycloolefin-based oligomer or polymer such as an olefin-based oligomer or a norbornene-based polymer, and a flexibilizer such as a synthetic rubber or a silicone compound; an antioxidant; and a defoaming agent. Those additives are each appropriately blended to such an extent that an effect is not impaired.

In addition, the following is performed to such an extent that the excellent effect is not impaired. An organic solvent is blended in addition to the respective components to be blended, and then the components are dissolved and mixed to prepare the resin composition for forming an optical waveguide as a varnish, which is used in application work. Examples of the organic solvent include methyl ethyl ketone, cyclohexanone, 2-butanone, N,N-dimethylacetamide, diglyme, diethylene glycol methyl ethyl ether, propylene glycol methyl ether acetate, propylene glycol monomethyl ether, tetramethylfuran, dimethoxyethane, and ethyl lactate. In order to attain a viscosity suitable for coating, one kind of those organic solvents is used alone in an appropriate amount, or two or more kinds thereof are used in combination in an appropriate amount.

The concentration of the specific polyvinyl acetal compound upon preparation of the resin composition through the blending of the organic solvent, which is appropriately set in consideration of its application workability, is preferably set to, for example, 20 to 80 wt %.

<<Optical Waveguide>>

Next, an optical waveguide using the resin composition for forming an optical waveguide is described.

Figure 1:
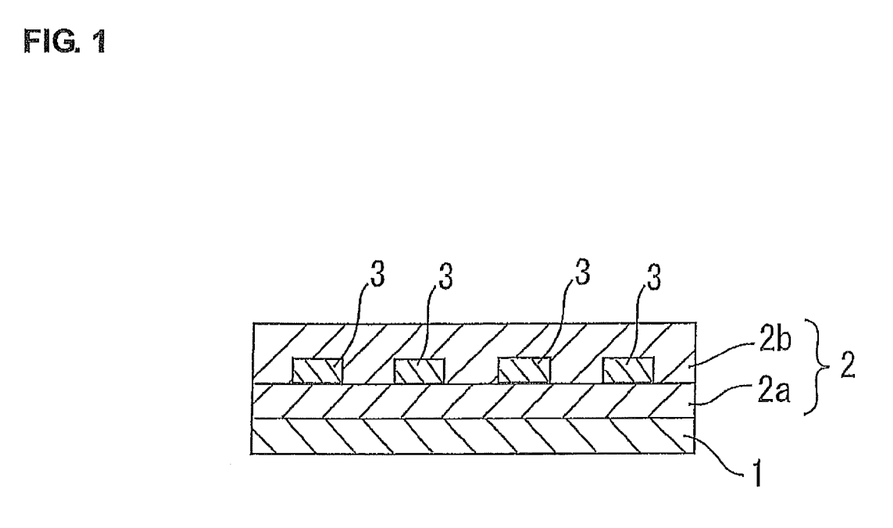
FIG. 1 is a cross-sectional view illustrating an example of an optical waveguide.

As illustrated in FIG. 1, the optical waveguide has, for example, a substrate 1 and a clad layer 2 formed on the substrate 1, the clad layer being formed of an underclad layer 2a and an overclad layer 2b, and is obtained by forming a core layer 3 for propagating an optical signal in the clad layer 2 in a predetermined pattern. In addition, in the optical waveguide, the clad layer 2 is formed of the resin composition for forming an optical waveguide. In particular, the resin composition for forming an optical waveguide is preferably used as each of both a material for forming the underclad layer 2a and a material for forming the overclad layer 2b. It should be noted that in the optical waveguide, the clad layer 2 needs to be formed so as to have a smaller refractive index than that of the core layer 3.

In addition, the refractive index of the clad layer 2 (cured product) formed by using the resin composition for forming an optical waveguide is preferably 1.50 or less, and the refractive index is particularly preferably 1.49 or less. That is, when the refractive index of the clad layer 2 (cured product) is 1.50 or less, the following effect is exerted. Its specific refractive index with respect to the core layer 3 formed of, for example, an aromatic resin material is large, which is advantageous to a static bending loss of the optical waveguide (the refractive index of a general aromatic resin material is typically around 1.56 to 1.58). It should be noted that the refractive index of the clad layer 2 (cured product) is measured, for example, as described below. The clad layer 2 (cured product) having a thickness of about 10 µm is produced on a smooth surface of a silicon wafer and then the refractive index of the cured film is measured with a prism coupler (model number SPA-4000) manufactured by SAIRON TECHNOLOGY.

Figure 2A:
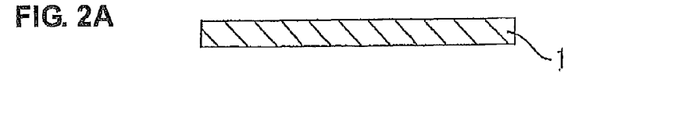
FIGS. 2A to 2F are explanatory diagrams illustrating a production process for the optical waveguide.
Figure 2B:
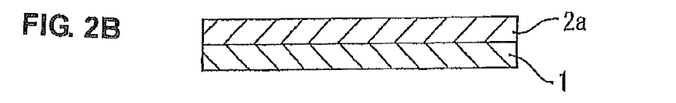
Figure 2C:
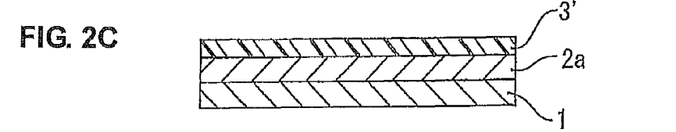
Figure 2D:
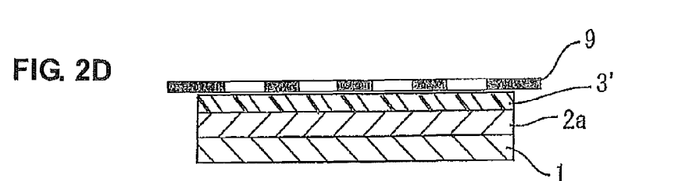
Figure 2E:
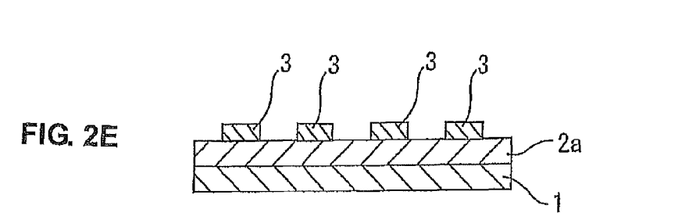
Figure 2F:
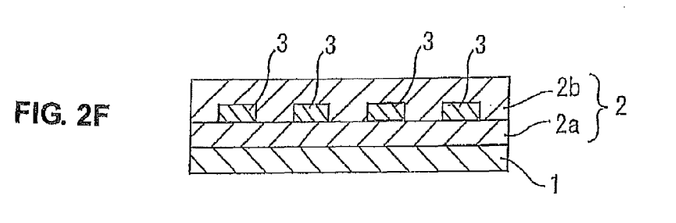

The optical waveguide can be produced through, for example, such a process as illustrated in FIGS. 2A to 2F. That is, as illustrated in FIG. 2A, the substrate 1 is prepared first. Then, as illustrated in FIG. 2B, the underclad layer 2a (lower portion of the clad layer 2) is formed on the surface of the substrate 1 by: applying a varnish using the resin composition for forming an optical waveguide to the surface; subjecting the applied varnish to photoirradiation such as ultraviolet irradiation; and performing a heat treatment as required. Next, as illustrated in FIG. 2C, a core-forming layer 3' is formed on the underclad layer 2a by applying a material for forming the core layer 3 onto the layer. Then, as illustrated in FIG. 2D, a photomask 9 for exposing a predetermined pattern (optical waveguide pattern) is provided on the surface of the core-forming layer 3', the surface is irradiated with light such as ultraviolet light through the photomask 9, and a heat treatment is performed as required. After that, the core layer 3 having the predetermined pattern is formed as illustrated in FIG. 2E by dissolving and removing the unexposed portion of the core-forming layer 3' with a developer. Next, as illustrated in FIG. 2F, the overclad layer 2b (upper portion of the clad layer 2) is formed on the core layer 3 by: applying the material for forming the overclad layer onto the layer; subjecting the applied material to photoirradiation such as ultraviolet irradiation; and performing a heat treatment as required. The target optical waveguide can be produced through such process.

A material for the substrate 1 is, for example, a silicon wafer, a metallic substrate, a polymer film, or a glass substrate. In addition, the metallic substrate is, for example, a stainless plate such as stainless steel. In addition, the polymer film is specifically, for example, a polyethylene terephthalate (PET) film, a polyethylene naphthalate film, or a polyimide film. In addition, its thickness is typically set to fall within the range of 10 µm to 3 mm.

In the photoirradiation, ultraviolet irradiation is specifically performed. A light source for ultraviolet light in the ultraviolet irradiation is, for example, a low-pressure mercury lamp, a high-pressure mercury lamp, or an ultra-high pressure mercury lamp. In addition, the dose of the ultraviolet light is, for example, typically 10 to 10,000 mJ/cm$^2$, preferably 50 to 5,000 mJ/cm$^2$, more preferably about 500 to 3,000 mJ/cm$^2$.

After the exposure by the ultraviolet irradiation, a heat treatment may be further performed for completing curing by a photoreaction. In ordinary cases, the heat treatment is performed under the conditions of a temperature in the range of 80 to 250° C., preferably 100 to 150° C. and a time in the range of 10 seconds to 2 hours, preferably 5 minutes to 1 hour.

In addition, when the resin composition for forming an optical waveguide is used as a material for forming the clad layer 2, the material for forming the core layer 3 is, for example, a resin composition using a phenoxy resin as a binder component, and appropriately containing an acrylic, photosensitive resin component and the various photoradical polymerization initiators. Further, in order that the resin composition may be prepared as a varnish and applied, the components are mixed with an organic solvent as in the foregoing and the solvent is used in such a proper amount that a viscosity suitable for the application is obtained.

Examples of the acrylic, photosensitive resin component include di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, 1,3-butanediol di(meth)acrylate, 2-methyl-1,3-propanediol di(meth)acrylate, aromatic (meth)acrylates such as bisphenol A di(meth)acrylate, bisphenol F di(meth)acrylate, bisphenol AF di(meth)acrylate, and a fluorene-type di(meth)acrylate, trimethylolpropane tri(meth)acrylate, pentaerythritol tri(meth)acrylate, dipentaerythritol hexa(meth)acrylate, ditrimethylolpropane tetra(meth)acrylate, pentaerythritol tetra(meth)acrylate, and dipentaerythritol penta (meth)acrylate. One kind of those components is used alone, or two or more kinds thereof are used in combination.

It should be noted that, for example, the following methods can each be employed as an application method involving using a material for forming each layer on the substrate 1: a coating method involving using a spin coater, a coater, a circular coater, a bar coater, or the like; a method involving forming a gap by means of screen printing or a spacer and injecting the material into the gap on the basis of a capillary phenomenon; and a method involving continuously coating the top of the substrate with the material with a coater such as a multicoater in a roll-to-roll fashion. In addition, the optical waveguide can be turned into a film-like optical waveguide by peeling and removing the substrate 1.

The optical waveguide thus obtained can be used as, for example, an optical wiring material for an opto-electric hybrid board.

EXAMPLES

Next, the present invention is described by way of examples, but the present invention is not limited to these examples.

Example 1

First, prior to the production of an optical waveguide serving as an example, respective photosensitive varnishes as a material for forming a clad layer and a material for forming a core layer were prepared.

<Preparation of Material for Forming Clad Layer>

Under a light-shielding condition, 30 g of a polyvinyl butyral (manufactured by SEKISUI CHEMICAL CO., LTD., S-LEC BM-1: in the formula (1), R=—$C_3H_7$, k=65±3, m=3 or less, n=about 34, weight-average molecular weight: 40,000), 35 g of a urethane acrylate resin (manufactured by Mitsubishi Chemical Corporation, UA-160™), 35 g of a trimethylolpropane (EO) triacrylate resin (manufactured by Sanyo Chemical Industries, Ltd., TA-401), and 1.0 g of an IRGACURE 819 (manufactured by Ciba Japan) and 3.0 g of an IRGACURE 127 (manufactured by Ciba Japan) as photoradical polymerization initiators were mixed in 233 g of cyclohexanone, and then the components were completely dissolved by stirring the mixture under heating at 85° C. After that, the solution was cooled to room temperature (25° C.), and was then filtered through a filter having a diameter of 7.0 µm under heating and pressure. Thus, the photosensitive varnish serving as a material for forming a clad layer was prepared.

<Preparation of Material for Forming Core Layer>

Under a light-shielding condition, 50 g of an aromatic, bifunctional epoxy acrylate (manufactured by Shin-Nakamura Chemical Co., Ltd., NK Oligo EA-1020), 50 g of a phenoxy resin (manufactured by Mitsubishi Chemical Corporation, EPIKOTE 1007), and 1.0 g of an IRGACURE 819 (manufactured by Ciba Japan) and 3.0 g of an IRGACURE 184 (manufactured by Ciba Japan) as photoradical polymerization initiators were mixed in 70 g of cyclohexanone, and then the components were completely dissolved by stirring the mixture under heating at 85° C. After that, the solution was cooled to room temperature (25° C.), and was then filtered through a filter having a diameter of 4.5 µm under heating and pressure. Thus, the photosensitive varnish serving as a material for forming a core layer was prepared.

<Production of Underclad Layer>

The top of a silicon wafer base material was coated with the photosensitive varnish as a material for forming a clad layer with a spin coater (conditions: 4,000 rpm×10 seconds). After that, the organic solvent was dried on a hot plate (120° C.×10 minutes). Thus, an underclad layer in an uncured state was formed. The uncured underclad layer thus formed was exposed with a UV irradiation machine (3,000 mJ/cm$^2$ (short-wavelength cut-off filter)). Thus, an underclad layer (thickness: 15 to 20 µm) was produced.

<Production of Core Layer>

The top of the underclad layer thus formed was coated with the photosensitive varnish as a material for forming a core layer with a spin coater (conditions: 1,500 rpm×10 seconds). After that, the organic solvent was dried on a hot plate (80° C.×5 minutes+120° C.×10 minutes). Thus, a core layer in an uncured state was formed. The uncured core layer thus formed was exposed with a predetermined mask pattern (pattern width/pattern interval (L/S)=50 µm/200 µm) of a UV irradiation machine (2,000 mJ/cm$^2$ (short-wavelength cut-off filter)). After that, the resultant was developed in γ-butyrolactone and washed with water, and then moisture was dried on a hot plate (120° C.×5 minutes). Thus, a core layer having the predetermined pattern (thickness: 50 to 55 µm) was produced.

<Production of Overclad Layer>

The top of the core layer thus formed was coated with the photosensitive varnish as a material for forming a clad layer with a spin coater (conditions: 800 rpm×10 seconds). After that, the organic solvent was dried on a hot plate (50° C.×5 minutes+120° C.×10 minutes). Thus, an overclad layer in an uncured state was formed. The uncured overclad layer thus formed was exposed with a UV irradiation machine (3,000 mJ/cm$^2$ (short-wavelength cut-off filter)). Thus, an overclad layer (thickness: 15 to 20 µm) was produced.

Thus, an optical waveguide in which the underclad layer was formed on the silicon wafer base material, the core layer having the predetermined pattern was formed on the underclad layer, and the overclad layer was formed on the core layer was produced.

Example 2

An optical waveguide in which an underclad layer was formed on a silicon wafer base material, a core layer having a predetermined pattern was formed on the underclad layer, and an overclad layer was formed on the core layer was produced in the same manner as in Example 1 except that in the preparation of the photosensitive varnish as a material for forming a clad layer, the blending ratios of the resin components were changed to 40 g of the polyvinyl butyral (manufactured by SEKISUI CHEMICAL CO., LTD., S-LEC BM-1), 30 g of the urethane acrylate resin (manufactured by Mitsubishi Chemical Corporation, UA-160™), and 30 g of the trimethylolpropane (EO) triacrylate resin (manufactured by Sanyo Chemical Industries, Ltd., TA-401).

Example 3

An optical waveguide in which an underclad layer was formed on a silicon wafer base material, a core layer having a predetermined pattern was formed on the underclad layer, and an overclad layer was formed on the core layer was produced in the same manner as in Example 1 except that in the preparation of the photosensitive varnish as a material for forming a clad layer, the blending ratios of the resin components were changed to 50 g of the polyvinyl butyral (manufactured by SEKISUI CHEMICAL CO., LTD., S-LEC BM-1), 25 g of the urethane acrylate resin (manufactured by Mitsubishi Chemical Corporation, UA-160™), and 25 g of the trimethylolpropane (EO) triacrylate resin (manufactured by Sanyo Chemical Industries, Ltd., TA-401).

Example 4

An optical waveguide in which an underclad layer was formed on a silicon wafer base material, a core layer having a predetermined pattern was formed on the underclad layer, and an overclad layer was formed on the core layer was produced in the same manner as in Example 1 except that in the preparation of the photosensitive varnish as a material for forming a clad layer, 30 g of the polyvinyl butyral (manufactured by SEKISUI CHEMICAL CO., LTD., S-LEC BM-1) in the blending composition of the resin components was changed to 30 g of the polyvinyl butyral (manufactured by SEKISUI CHEMICAL CO., LTD., S-LEC BM-S: in the formula (1), R=—$C_3H_7$, k=73±3, m=4 to 6, n=about 22, weight-average molecular weight: 53,000).

Example 5

An optical waveguide in which an underclad layer was formed on a silicon wafer base material, a core layer having a predetermined pattern was formed on the underclad layer, and an overclad layer was formed on the core layer was produced in the same manner as in Example 4 except that in the preparation of the photosensitive varnish as a material for forming a clad layer, the blending ratios of the resin components were changed to 40 g of the polyvinyl butyral (manufactured by SEKISUI CHEMICAL CO., LTD., S-LEC BM-S), 30 g of the urethane acrylate resin (manufactured by Mitsubishi Chemical Corporation, UA-160™), and 30 g of the trimethylolpropane (EO) triacrylate resin (manufactured by Sanyo Chemical Industries, Ltd., TA-401).

Example 6

An optical waveguide in which an underclad layer was formed on a silicon wafer base material, a core layer having a predetermined pattern was formed on the underclad layer, and an overclad layer was formed on the core layer was produced in the same manner as in Example 4 except that in the preparation of the photosensitive varnish as a material for forming a clad layer, the blending ratios of the resin components were changed to 50 g of the polyvinyl butyral (manufactured by SEKISUI CHEMICAL CO., LTD., S-LEC BM-S), 25 g of the urethane acrylate resin (manufactured by Mitsubishi Chemical Corporation, UA-160™), and 25 g of the trimethylolpropane (EO) triacrylate resin (manufactured by Sanyo Chemical Industries, Ltd., TA-401).

Example 7

An optical waveguide in which an underclad layer was formed on a silicon wafer base material, a core layer having a predetermined pattern was formed on the underclad layer, and an overclad layer was formed on the core layer was produced in the same manner as in Example 1 except that in the preparation of the photosensitive varnish as a material for forming a clad layer, the blending ratios of the resin components were changed to 20 g of the polyvinyl butyral (manufactured by SEKISUI CHEMICAL CO., LTD., S-LEC BM-1), 40 g of the urethane acrylate resin (manufactured by Mitsubishi Chemical Corporation, UA-160™), and 40 g of the trimethylolpropane (EO) triacrylate resin (manufactured by Sanyo Chemical Industries, Ltd., TA-401).

Example 8

An optical waveguide in which an underclad layer was formed on a silicon wafer base material, a core layer having a predetermined pattern was formed on the underclad layer, and an overclad layer was formed on the core layer was produced in the same manner as in Example 4 except that in the preparation of the photosensitive varnish as a material for forming a clad layer, the blending ratios of the resin components were changed to 20 g of the polyvinyl butyral (manufactured by SEKISUI CHEMICAL CO., LTD., S-LEC BM-S), 40 g of the urethane acrylate resin (manufactured by Mitsubishi Chemical Corporation, UA-160™), and 40 g of the trimethylolpropane (EO) triacrylate resin (manufactured by Sanyo Chemical Industries, Ltd., TA-401).

Example 9

An optical waveguide in which an underclad layer was formed on a silicon wafer base material, a core layer having a predetermined pattern was formed on the underclad layer, and an overclad layer was formed on the core layer was produced in the same manner as in Example 1 except that in the preparation of the photosensitive varnish as a material for forming a clad layer, the blending ratios of the resin components were changed to 70 g of the polyvinyl butyral (manufactured by SEKISUI CHEMICAL CO., LTD., S-LEC BM-1), 15 g of the urethane acrylate resin (manufactured by Mitsubishi Chemical Corporation, UA-160™), and 15 g of the trimethylolpropane (EO) triacrylate resin (manufactured by Sanyo Chemical Industries, Ltd., TA-401).

Example 10

An optical waveguide in which an underclad layer was formed on a silicon wafer base material, a core layer having a predetermined pattern was formed on the underclad layer, and an overclad layer was formed on the core layer was produced in the same manner as in Example 4 except that in the preparation of the photosensitive varnish as a material for forming a clad layer, the blending ratios of the resin components were changed to 70 g of the polyvinyl butyral (manufactured by SEKISUI CHEMICAL CO., LTD., S-LEC BM-S), 15 g of the urethane acrylate resin (manufactured by Mitsubishi Chemical Corporation, UA-160™), and 15 g of the trimethylolpropane (EO) triacrylate resin (manufactured by Sanyo Chemical Industries, Ltd., TA-401).

Comparative Example 1

An optical waveguide in which an underclad layer was formed on a silicon wafer base material, a core layer having a predetermined pattern was formed on the underclad layer, and an overclad layer was formed on the core layer was produced in the same manner as in Example 1 except that in the preparation of the photosensitive varnish as a material for forming a clad layer, the blending ratios of the resin components were changed to 10 g of the phenoxy resin (manufactured by NIPPON STEEL & SUMIKIN CHEMICAL CO., LTD., EPIKOTE YP-70: weight-average molecular weight: 50,000 to 60,000), 45 g of the urethane acrylate resin (manufactured by Mitsubishi Chemical Corporation, UA-160™), and 45 g of the trimethylolpropane (EO) triacrylate resin (manufactured by Sanyo Chemical Industries, Ltd., TA-401).

Comparative Example 2

An optical waveguide in which an underclad layer was formed on a silicon wafer base material, a core layer having a predetermined pattern was formed on the underclad layer, and an overclad layer was formed on the core layer was produced in the same manner as in Comparative Example 1 except that in the preparation of the photosensitive varnish as a material for forming a clad layer, the blending ratios of the resin components were changed to 30 g of the phenoxy resin (manufactured by NIPPON STEEL & SUMIKIN CHEMICAL CO., LTD., EPIKOTE YP-70), 35 g of the urethane acrylate resin (manufactured by Mitsubishi Chemical Corporation, UA-160™), and 35 g of the trimethylolpropane (EO) triacrylate resin (manufactured by Sanyo Chemical Industries, Ltd., TA-401).

Comparative Example 3

An optical waveguide in which an underclad layer was formed on a silicon wafer base material, a core layer having a predetermined pattern was formed on the underclad layer, and an overclad layer was formed on the core layer was produced in the same manner as in Example 1 except that in the preparation of the photosensitive varnish as a material for forming a clad layer, the blending ratios of the resin components were changed to 50 g of the phenoxy resin (manufactured by NIPPON STEEL & SUMIKIN CHEMICAL CO., LTD., EPIKOTE YP-70), 25 g of the urethane acrylate resin (manufactured by Mitsubishi Chemical Corporation, UA-160™), and 25 g of the trimethylolpropane (EO) triacrylate resin (manufactured by Sanyo Chemical Industries, Ltd., TA-401).

Each of the optical waveguides thus obtained was measured and evaluated for its tensile modulus, bending property, refractive index, relative refractive index difference, bending loss, and tackiness in accordance with the following methods. Table 1 and Table 2 below show these results together with blending compositions.

(Tensile Modulus)

A film formed of a material for forming a clad layer, which had been produced under the curing condition and had a thickness of about 80 μm, was cut into a piece measuring 10 mm wide by 120 to 140 mm long, and the piece was used as an evaluation sample. Then, the tensile modulus of the sample was measured with a tensile tester (manufactured by Minebea Co., Ltd., model TG-1KN). With regard to measuring conditions, the tensile modulus was determined by performing a tensile test under the conditions of a chuck-to-chuck distance of 50 mm and a tension speed of 50 mm/min.

(Bending Property)

A piece measuring 5 mm wide by 50 mm long was cut out of a film formed of a material for forming a clad layer, which had been produced under the curing condition, and was then subjected to an IPC slide test under the conditions of a bending radius (r) of 1.5 mm, a slide distance of 20 mm, and a slide speed of 20 mm/sec. The result was evaluated on the basis of the following criteria.

○: The piece did not rupture even after having been bent more than 100,000 times.

Δ: The piece ruptured after having been bent 30,000 to 100,000 times.

x: The piece ruptured after having been bent less than 30,000 times.

(Refractive Index)

The refractive index of the clad layer of each of the resultant optical waveguides was measured as described below. That is, a material for forming a clad layer was uniformly applied onto a silicon wafer having a thickness of 0.56 mm by a spin coating method, and was then cured under the curing condition. Thus, a film having a thickness of about 10 μm was produced. The refractive index of the film at 850 nm was measured with a prism coupler (model number SPA-4000) manufactured by SAIRON TECHNOLOGY.

(Relative Refractive Index Difference)

The refractive index of the core layer was measured with the material for forming a core layer in the same manner as in the foregoing. As a result, a refractive index of 1.57 was obtained. A relative refractive index difference (%) was calculated from the resultant refractive indices of both the clad and core layers in accordance with the following equation.

Relative refractive index difference (%)=(refractive index of core layer−refractive index of clad layer)/refractive index of core layer×100

(Bending Loss)

A bending loss upon winding of each optical waveguide around a metal rod having a diameter of 2 mm by 360° was calculated as described below. Light emitted from an 850-nm VCSEL light source OP250 manufactured by MIKI INC. was condensed with a multimode fiber (manufactured by MIKI INC., FFP-G120-0500 (MMF having a diameter of 50 μm, NA=0.2)) and then caused to enter the sample. Then, light exited from the sample was condensed with a lens (manufactured by SEIWA OPTICAL Co., Ltd., FH14-11 (magnification: 20, NA=0.4)) and then 6 channels were evaluated with an optical measurement system (manufactured by Advantest Corporation, Optical Multipower Meter Q8221). The bending loss was calculated from a difference between their average total loss and a total loss at the time of linear loss similarly evaluated. The result was evaluated on the basis of the following criteria.

○: An increase in loss as compared with the initial value was less than 0.3 dB.

Δ: An increase in loss as compared with the initial value was 0.3 to 0.5 dB.

x: The result was such that an increase in loss as compared with the initial value exceeded 0.5 dB.

(Tackiness)

With regard to tackiness, the surface of the clad layer of each optical waveguide was confirmed by a finger touch. The result was evaluated on the basis of the following criteria.

○: No trace of the finger touch remained on the surface of the clad layer and nothing was transferred onto the finger.

Δ: A trace of the finger touch remained on the surface of the clad layer but nothing was transferred onto the finger (the clad layer can be moved toward an R-to-R process by using a surface protective layer such as a Mylar).

x: The surface of the clad layer was rough and a resin component was transferred onto the finger (the clad layer cannot be moved toward the R-to-R process even by using a surface protective layer such as a Mylar).

TABLE 1

| | | Example (g) | | | | | | | | | |
|---|---|---|---|---|---|---|---|---|---|---|---|
| | | 1 | 2 | 3 | 4 | 5 | 6 | 7 | 8 | 9 | 10 |
| Binder resin | S-LEC BM-1 | 30 | 40 | 50 | — | — | — | 20 | — | 70 | — |
| | S-LEC BM-S | — | — | — | 30 | 40 | 50 | — | 20 | — | 70 |
| | EPIKOTE YP-70 | — | — | — | — | — | — | — | — | — | — |
| UA-160TM | | 35 | 30 | 25 | 35 | 30 | 25 | 40 | 40 | 15 | 15 |
| TA-401 | | 35 | 30 | 25 | 35 | 30 | 25 | 40 | 40 | 15 | 15 |
| Photoradical polymerization initiator | IRGACURE 819 | 1 | 1 | 1 | 1 | 1 | 1 | 1 | 1 | 1 | 1 |
| | IRGACURE 127 | 3 | 3 | 3 | 3 | 3 | 3 | 3 | 3 | 3 | 3 |
| Tensile modulus (GPa) | | 0.7 | 0.9 | 1.1 | 0.8 | 1.0 | 1.2 | 0.5 | 0.6 | 1.3 | 1.4 |
| Bending property | | ○ | ○ | Δ | ○ | Δ | Δ | ○ | ○ | Δ | Δ |
| Refractive index | | 1.49 | 1.49 | 1.49 | 1.49 | 1.49 | 1.49 | 1.49 | 1.49 | 1.49 | 1.49 |
| Relative refractive index difference (%) | | 4.9 | 4.9 | 4.9 | 4.9 | 4.9 | 4.9 | 4.9 | 4.9 | 4.9 | 4.9 |
| Bending loss | | ○ | ○ | ○ | ○ | ○ | ○ | ○ | ○ | ○ | ○ |
| Tackiness | | ○ | ○ | ○ | ○ | ○ | ○ | Δ | Δ | ○ | ○ |

TABLE 2

| | | Comparative Example (g) | | |
|---|---|---|---|---|
| | | 1 | 2 | 3 |
| Binder resin | S-LEC BM-1 | — | — | — |
| | S-LEC BM-S | — | — | — |
| | EPIKOTE YP-70 | 10 | 30 | 50 |
| UA-160TM | | 45 | 35 | 25 |
| TA-401 | | 45 | 35 | 25 |
| Photoradical polymerization initiator | IRGACURE 819 | 1 | 1 | 1 |
| | IRGACURE 127 | 3 | 3 | 3 |
| Tensile modulus (GPa) | | 1.0 | 1.5 | 2.0 |
| Bending property | | Δ | x | x |
| Refractive index | | 1.51 | 1.53 | 1.55 |
| Relative refractive index difference (%) | | 3.8 | 2.6 | 1.3 |
| Bending loss | | Δ | x | x |
| Tackiness | | x | x | ○ |

As can be seen from the results, the product of each example as an optical waveguide provided with a clad layer formed by using a photosensitive varnish obtained by blending a specific polyvinyl acetal compound had good bending resistance, and showed excellent results in terms of a bending loss and tackiness. In particular, the products of Examples 1, 2, and 4 each had additionally excellent bending resistance and additionally excellent tackiness.

In contrast, the product of Comparative Example 1 as the optical waveguide provided with the clad layer formed by using the photosensitive varnish obtained by blending the phenoxy resin instead of the specific polyvinyl acetal compound at 10 wt % of the entirety of the resin components had a high refractive index and showed a result inferior to those of the products of the examples in terms of a bending loss. In addition, a transfer occurred in the evaluation for its tackiness.

In addition, the product of Comparative Example 2 as the optical waveguide provided with the clad layer formed by using the photosensitive varnish obtained by blending the phenoxy resin at 30 wt % of the entirety of the resin components showed a good result in terms of tackiness but showed results inferior to those of the products of the examples in terms of bending resistance and a bending loss.

In addition, the product of Comparative Example 3 as the optical waveguide provided with the clad layer formed by using the photosensitive varnish obtained by blending the phenoxy resin at 50 wt % of the entirety of the resin components showed results inferior to those of the products of the examples in terms of all of bending resistance, a bending loss, and tackiness.

The resin composition for forming an optical waveguide of the present invention is useful as a material for forming a component of an optical waveguide, in particular, a material for forming a clad layer. In addition, an optical waveguide produced by using the resin composition for forming an optical waveguide is used in, for example, the optical wiring of an opto-electric hybrid board.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An optical waveguide, comprising:

a substrate; and a clad layer formed on the substrate, the clad layer including at least one of an underclad layer and an overclad layer, wherein the optical waveguide is obtained by forming a core layer for propagating an optical signal, the core layer being disposed on the underclad layer, below the overclad layer, or between the underclad layer and the overclad layer, in a predetermined pattern, and wherein the clad layer is formed of a resin composition comprising a polyvinyl acetal compound having a structural unit represented by the following general formula (1) at a ratio of 25 wt % or more of the entirety of the resin composition:

wherein in the formula (1), R represents an alkyl group having 1 to 3 carbon atoms, and k, m, and n represent ratios of respective repeating units in a main chain and each represent an integer of 1 or more, wherein the resin composition further comprises at least one acrylate-based resin, and wherein the resin composition is obtained by dissolving polymerizable resin components in an organic solvent, and a mixing ratio of the polyvinyl acetal compound having the structural unit represented by the general formula (1) is 20 to 80 wt % with respect to the polymerizable resin components in the resin composition.

2. The optical waveguide according to claim 1, wherein the optical waveguide is produced by a roll-to-roll process.

3. The optical waveguide according to claim 1, further comprising a photoradical polymerization initiator.

4. The optical waveguide according to claim 3, wherein a cured product of the resin composition has a refractive index of 1.50 or less.

5. The optical waveguide according to claim 3, wherein the optical waveguide is produced by a roll-to-roll process.

6. The optical waveguide according to claim 3,
wherein a cured product of the resin composition has a refractive index of 1.50 or less, and
wherein the resin composition comprises the at least one acrylate-based resin at a ratio of 30-70 wt % of the entirety of the resin composition.

7. The optical waveguide according to claim 3, wherein the polyvinyl acetal compound having the structural unit represented by the general formula (1) is present at a ratio of 30 wt % or more of the entirety of the resin composition.

8. The optical waveguide according to claim 3, wherein a mixing ratio of the polyvinyl acetal compound having the structural unit represented by the general formula (1) is 20 to 60 wt % with respect to the polymerizable resin components in the resin composition.

9. The optical waveguide according to claim 3, wherein a mixing ratio of the polyvinyl acetal compound having the structural unit represented by the general formula (1) is 20 to 40 wt % with respect to the polymerizable resin components in the resin composition.

10. The optical waveguide according to claim 1, wherein a cured product of the resin composition has a refractive index of 1.50 or less.

11. The optical waveguide according to claim 1, wherein the polymerizable resin components in the resin composition consist of the polyvinyl acetal compound and at least one acrylate-based resin.

12. The optical waveguide according to claim 1, wherein the resin composition comprises the polyvinyl acetal compound at a ratio of 28.85 wt % or more of the entirety of the resin composition.

13. The optical waveguide according to claim 1,
wherein a cured product of the resin composition has a refractive index of 1.50 or less, and
wherein the resin composition comprises the at least one acrylate-based resin at a ratio of 30-70 wt % of the entirety of the resin composition.

14. The optical waveguide according to claim 1, wherein the polyvinyl acetal compound having the structural unit represented by the general formula (1) is present at a ratio of 30 wt % or more of the entirety of the resin composition.

15. The optical waveguide according to claim 1, wherein a mixing ratio of the polyvinyl acetal compound having the structural unit represented by the general formula (1) is 20 to 60 wt % with respect to the polymerizable resin components in the resin composition.

16. The optical waveguide according to claim 1, wherein a mixing ratio of the polyvinyl acetal compound having the structural unit represented by the general formula (1) is 20 to 40 wt % with respect to the polymerizable resin components in the resin composition.

17. An optical waveguide, comprising:
a substrate; and
a clad layer formed on the substrate, the clad layer including at least one of an underclad layer and an overclad layer,
wherein the optical waveguide is obtained by forming a core layer for propagating an optical signal, the core layer being disposed on the underclad layer, below the overclad layer, or between the underclad layer and the overclad layer, in a predetermined pattern, and
wherein the clad layer is formed of a resin composition comprising
a polyvinyl acetal compound having a structural unit represented by the following general formula (1) at a ratio of 25 wt % or more of the entirety of the resin composition:

wherein in the formula (1), R represents an alkyl group having 1 to 3 carbon atoms, and k, m, and n represent ratios of respective repeating units in a main chain and each represent an integer of 1 or more, wherein the resin composition further comprises at least one acrylate-based resin, wherein a cured product of the resin composition has a refractive index of 1.50 or less, and wherein the resin composition comprises the at least one acrylate-based resin at a ratio of 30-70 wt % of the entirety of the resin composition.

18. The optical waveguide according to claim 17, wherein the optical waveguide is produced by a roll-to-roll process.

19. The optical waveguide according to claim 17, further comprising a photoradical polymerization initiator.

20. The optical waveguide according to claim 17, wherein the resin composition is obtained by dissolving polymerizable resin components in an organic solvent, and a mixing ratio of the polyvinyl acetal compound having the structural unit represented by the general formula (1) is 20 to 80 wt % with respect to the polymerizable resin components in the resin composition.

* * * * *